United States Patent [19]  [11] 4,415,681
Horvath  [45] Nov. 15, 1983

[54] STABILIZED CROSSLINKED DISPERSION

[75] Inventor: Stanley K. Horvath, Rochester, Mich.

[73] Assignee: Ford Motor Company, Dearborn, Mich.

[21] Appl. No.: 292,853

[22] Filed: Aug. 14, 1981

Related U.S. Application Data

[63] Continuation-in-part of Ser. No. 199,899, Oct. 23, 1980, abandoned.

[51] Int. Cl.$^3$ .................... C08F 265/06; C08F 2/14; C08G 12/32; C08L 61/28
[52] U.S. Cl. .................... 523/334; 523/333; 524/315; 524/504; 524/512; 525/63; 525/66; 525/69; 525/125; 525/286; 525/298; 525/450; 525/518
[58] Field of Search ............. 525/66, 69, 93, 155, 525/156, 110, 111, 286, 298, 299, 63, 123–125, 450, 518; 524/504, 512, 315; 523/333, 334

[56] References Cited

U.S. PATENT DOCUMENTS

| | | | |
|---|---|---|---|
| 3,966,667 | 6/1976 | Sullivan et al. | 260/31.2 N |
| 4,002,699 | 1/1977 | Labana et al. | 525/155 |
| 4,065,518 | 12/1977 | Labana et al. | 525/286 |
| 4,147,688 | 4/1979 | Makhlouf et al. | 260/33.6 GP |
| 4,180,489 | 12/1979 | Andrew et al. | 260/70 |
| 4,241,196 | 12/1980 | Chattha | 525/162 |
| 4,242,354 | 12/1980 | Andrew et al. | 525/85 |
| 4,246,212 | 6/1981 | Khanna et al. | 525/162 |
| 4,290,932 | 9/1981 | Wright et al. | 525/198 |
| 4,297,448 | 10/1981 | Chang et al. | 525/162 |
| 4,322,508 | 3/1982 | Peng et al. | 525/110 |
| 4,330,458 | 5/1982 | Spinelli et al. | 525/162 |
| 4,337,189 | 6/1982 | Bromley et al. | 524/529 |
| 4,340,511 | 7/1982 | Backhouse et al. | 525/69 |

*Primary Examiner*—Melvyn I. Marquis
*Assistant Examiner*—Herbert J. Lilling
*Attorney, Agent, or Firm*—Roger L. May; Keith L. Zerschline

[57] ABSTRACT

A stable crosslinked dispersion formed by addition polymerization of selected monomers in the presence of a novel polymeric dispersion stabilizer. Improvement of invention comprises further stabilization of the dispersion by inclusion therein of a butylated melamine formaldehyde resin.

18 Claims, No Drawings

STABILIZED CROSSLINKED DISPERSION

This application is a continuation-in-part of Ser. No. 199,899 filed Oct. 23, 1980 and now abandoned.

BACKGROUND OF THE INVENTION

This invention relates to stable crosslinked dispersions which contain microgel particles and which are prepared by addition polymerization of (a) first and second ethylenically unsaturated monomers each bearing functionality capable of crosslinking with the other and (b) at least one other monoethylenically unsaturated monomer, in the presence of (I) organic liquid which is a solvent for the polymerizable monomers, but a non-solvent for the resultant polymer and (II) a particular polymeric dispersion stabilizer capable of reacting with monomers employed in the addition polymerization. More particularly, the invention relates to such stable crosslinked dispersions wherein the polymeric dispersion stabilizer comprises a random copolymer segment of ethylenically unsaturated monomers, some of which are characterized in that homopolymers thereof would be substantially insoluble in the organic liquid used to form the stable dispersion and some of which are characterized in that homopolymers thereof would be substantially soluble in the organic liquid used to form the stable dispersion. Still more particularly, the invention relates to such stable crosslinked dispersions, wherein the dispersion is further stabilized by an additional stabilizer which, except for solvents, consists essentially of butylated melamine formaldehyde resin.

Copending Applications

Several copending patent applications, all assigned to Ford Motor Company, and all in the name of Stanley K. Horvath, cover related compositions.

Application Ser. No. 200,222 filed Oct. 23, 1980 and entitled "Improved Stable Crosslinked Dispersion" (Case A) teaches stabilization of crosslinked dispersions of the type disclosed in U.S. Pat. No. 4,147,688 to Makhlouf et al which is discussed hereinafter.

Application Ser. No. 292,843 filed concurrently herewith and entitled "Paint Composition Comprising Hydroxy Functional Film Former and Improved Stabilizer Flow Control Additive (a continuation-in-part of Ser. Nos. 199,794, 199,805, and 199,776, all filed Oct. 23, 1980) and application Ser. No. 292,780 also filed concurrently herewith and entitled "Hydroxy Functional Paint Composition With Improved Stable Flow Control Additive (a continuation-in-part of Ser. Nos. 199,775, 199,774 and 199,772 filed Oct. 23, 1980) claim paint compositions comprising hydroxy functional film former crosslinked by an appropriate crosslinking agent and also containing the stabilized flow control additive of this application and Case A above respectively. Preferred embodiments of these compositions are specific intermediate and high solids paints.

Stable crosslinked dispersions containing microgel particles are well known in the art. U.S. Pat. No. 4,147,688 to Makhlouf et al teaches such crosslinked dispersions wherein crosslinked acrylic polymer microgel particles are formed by free radical addition polymerization of alpha, beta ethylenically unsaturated monocarboxylic acid, at least one other copolymerizable monoethylenically unsaturated monomer and a certain percentage of crosslinking monomer, in the presence of a hydrocarbon dispersing liquid (see abstract, examples and claims). Other crosslinked dispersions containing microgel particles are disclosed in the patent applications and patents referred to in the Makhlouf et al disclosure.

All of these stable crosslinked dispersions contain microgel particles and are of the dispersion type generally referred to in the art as nonaqueous dispersions. These nonaqueous dispersions have been developed in recent years in attempts to improve the efficiency of applying protective or decorative coatings to a variety of objects and have been particularly widely used in the coating of motor vehicle bodies and vehicle components. Those skilled in the art will be aware of numerous prior art references relating to nonaqueous dispersion technology. Among the more pertinent prior art references, insofar as this invention is concerned, in addition to the Makhlouf et al patent and the patents referred to therein, are those which have taught various improved stabilizers and methods of making the same. These include: U.S. Pat. Nos. 3,317,635 to Osmond et al; 3,514,500 to Osmond et al; 3,607,821 to Clarke; and 3,814,720 and 3,814,721 both to Maker et al.

U.S. Pat. No. 3,317,635 to Osmond et al teaches nonaqueous dispersions stabilized by block or graft copolymers of ethylenically unsaturated monomers with a precursor containing a polymeric chain and an unsaturated group with which the monomer polymerizes in vinyl-type manner to produce a polymeric vinyl chain of a different degree of polarity from the original polymeric chain (Col. 2, lines 1-9). Stable dispersions of synthetic monomers in organic liquids may be made in accordance with Osmond et al by precipitating the polymer in the organic liquid in the presence of the stabilizer such that one polymeric chain is solvated by the organic liquid and another is non-solvated and consequently becomes associated with the non-solvated polymer (Col. 2, lines 50-56).

U.S. Pat. No. 3,514,500 to Osmond et al teaches a stabilizer for nonaqueous dispersions, which stabilizer comprises a polymeric backbone and attached thereto at least five side chains of different polarity than the backbone (See abstract). The side chains are attached to the backbone by a condensation reaction between side chains containing only one reactive group per molecule and a backbone containing at least five complementary reactive groups per molecule (Col. 1, line 71-Col. 2, line 1).

U.S. Pat. No. 3,607,821 to Clarke teaches a stabilizer for nonaqueous dispersions wherein the stabilizer is chemically reacted with dispersed particles of the dispersion (Col. 1, lines 36-42). Each co-reacted stabilizer molecule forms from 1 to 10 (preferably 1 to 4) covalent links with the dispersed polymer (Col. 1, lines 50-52). The covalent links between the stabilizer and the dispersed polymer are formed by reaction between chemical groups provided by the stabilizer and complementary chemical groups provided by the dispersed polymer or by copolymerization reaction (Col. 1, lines 63-67).

U.S. Pat. No. 3,814,720 assigned to Ford Motor Company, the assignee of this application, teaches nonaqueous dispersions which employ a methylolated addition copolymer of an ethenic monomer and an amide of an unsaturated acid (see abstract and claims).

U.S. Pat. No. 3,814,721, also to Maker et al and also assigned to Ford Motor Company, teaches nonaqueous dispersions which are prepared employing a precursor addition copolymer which is prepared by reacting an active ethenic monomer having a functional epoxy, hydroxy, cyanato, or carboxy group with another active ethenic monomer free of functional groups in an aromatic or alcoholic solvent, followed by addition of an aliphatic liquid in which the polymer is insoluble, followed still further by the addition of a third ethenic monomer having one of such functional groups and a forth ethenic monomer free of such functional groups, such that the aliphatic liquid is a non-solvent for the second addition copolymer which is dispersed throughout the medium (see abstract, examples and claims).

BRIEF DESCRIPTION OF THE INVENTION

The crosslinked dispersions of the type to which the improvement of this invention applies are those which are formed by addition polymerization of (a) first and second ethylenically unsaturated monomers each bearing functionality capable of crosslinking reaction with the other and (b) at least one other monoethylenically unsaturated monomer, in the presence of (I) organic liquid which is a solvent for the polymerizable monomers, but a non-solvent for the resultant polymer, and (II) a polymeric dispersion stabilizer. The polymeric dispersion stabilizer comprises the reaction product of ethylenically unsaturated monomers (A) and copolymer reactant (B). The ethylenically unsaturated monomers (A) bear functionality capable of condensation reaction with complementary functionality of the copolymer reactant (B). Copolymer reactant (B) comprises a random copolymer of ethylenically unsaturated monomers, homopolymers of which would be substantially insoluble in the organic liquid used to form the crosslinked dispersion, ethylenically unsaturated monomers, homopolymers of which would be substantially soluble in the organic liquid used to form the crosslinked dispersion, and ethylenically unsaturated monomers bearing the complementary functionality capable of condensation reaction with the ethylenically unsaturated monomers (A). The polymeric dispersion stabilizer is prepared by reacting a copolymer reactant (B) with ethylenically unsaturated monomers (A) in an amount sufficient to react at least about 10% of the complementary functionality in the copolymer reactant (B). The crosslinked dispersion is prepared by carrying out the addition polymerization at an elevated temperature such that the dispersion polymer is first formed and then crosslinked.

The improvement of the invention comprises including in the crosslinked dispersion a further stabilizer which, except for solvents, consists essentially of a butylated melamine formaldeyde resin having a number average molecular weight in the range of about 700 to about 2,500. This further stabilizer is included in the crosslinked dispersion in an amount ranging from about 25 to about 75 parts of resin solids per 100 parts of total resin solids in a crosslinked dispersion.

DETAILED DESCRIPTION OF THE INVENTION

The improvement of the invention comprises further stabilization of crosslinked dispersions containing microgel particles as described above. The improvement is effected by adding to the crosslinked dispersions a further stabilizer which, except for any solvent present in the stabilizer composition, consists essentially of butylated melamine formaldehyde resin having a number average molecular weight in the range of from about 700 to about 2,500. This stabilizer is included in the crosslinked dispersion in an amount ranging from about 25 to about 75 parts, preferably from about 40 to about 60 parts, of resin solids per 100 parts of total resin solids in the crosslinked dispersion. Preferably the further stabilized dispersion of the invention have a solids level after addition of the further stabilizer and any additional solvent that may be desired in the range of 30 to 70 percent, most preferably in the range of 40 to 60 percent. Generally the further additive will be added to the crosslinked dispersion as a solution comprising one or more solvents for the butylated melamine formaldehyde resin. Preferably the further stabilizer should consist essentially of a solution of butylated melamine formaldehyde resin in an organic solvent in an amount such that the percentage solids of the butylated melamine formaldehyde resin in the solvent ranges from about 50 to about 90 percent. In a particularly preferred embodiment the further stabilizer consists essentially of a 65 percent solids solution of the butylated melamine formaldehyde resin in a 2 to 1 solution of butyl acetate and butyl alcohol.

Suitable butylated melamine formaldehyde resins for use as the further stabilizing additive of the invention are those prepared by condensation of melamine, formaldehyde and butyl alcohol either in a one step process under acidic conditions or in a two step process in which the melamine and formaldehyde are reacted under basic conditions followed by etherification under acidic conditions. The molecular weight is governed by the ratios of the three components. High ratios of formaldehyde to melamine and high ratios of alcohol to formaldehyde tend to yield lower molecular weight resin. The molar ratio of formaldehyde to melamine ranges from about 3.0 to 6, while the molar ratio of butanol to melamine may range from 6 to 12. Only a portion of the alcohols react and the remainder acts as a solvent. Molecular weight distributions are generally wide, with the $M_w$ range being from about 2,000 to about 10,000 and the $M_n$ ranging as stated above.

The crosslinked dispersions of microgel particles to which the improvement of this invention applies are prepared by addition polymerization of (a) between about 1 and about 10 mole percent, preferably between about 2 and about 5 mole percent, each of first and second ethylenically unsaturated monomers, each bearing functionality capable of crosslinking with the other and (b) between about 80 and about 98 mole percent, preferably between about 90 and about 96 mole percent, of at least one other monoethylenically unsaturated monomer. The addition polymerization is carried out in the presence of an organic liquid which is a solvent for the polymerizable monomers, but a non-solvent for the resultant polymer and in the presence of the aforementioned polymeric dispersion stabilizer.

The crosslinking functionalities on the first and second ethylenically unsaturated monomers (A) in this type of microgel dispersion can be selected from a wide variety of functionalities which will be apparent to those skilled in the art. Among the preferred pairs of crosslinking functionalities which may be present on the first and second ethylenically unsaturated monomers are: acid and epoxide; epoxide and amine; acid anhydride and hydroxyl; acid anhydride and amine; acid anhydride and mercaptan; isocyanate and hydroxyl; hemiformal and amide; carbonate and amine; cycloimide and amine; cycloimide and hydroxyl; imine and alkoxysilane; etc.

While the first and second ethylenically unsaturated monomers (a) may be any ethylenically unsaturated monomer within the scope of such term (i.e., any monomer which bears ethylenic unsaturation, including doubly unsaturated monomers such as butadiene and which is capable of polymerizing in vinyl-type manner), it is preferred that the monomers be acrylic monomers (i.e., monomers based on acrylic, methacrylic or ethacrylic acids).

A preferred class of crosslinked dispersions within the scope of the invention is formed by free radical addition copolymerization, in the presence of the polymeric dispersion stabilizer and in the presence of a hydrocarbon dispersing liquid of: from about 1 to about 10, preferably from about 2 to about 5, mole percent of alpha, beta ethylenically unsaturated monocarboxylic acid; from about 80 to about 98, preferably from about 90 to about 96, mole percent of at least one other copolymerizable monoethylenically unsaturated monomer; and from about 1 to about 10, preferably from about 2 to about 5, mole percent of a crosslinking monomer selected from the group consisting of ethylenically unsaturated monoepoxides. The preferred alpha, beta ethylenically unsaturated monocarboxylic acids for use in this class of crosslinked dispersions are acrylic acid and methacrylic acid, with methacrylic acid being especially preferred.

Various other monoethylenically unsaturated monomers may be copolymerized with the acid monomer in the preparation of this class of crosslinked dispersion. Although essentially any copolymerizable monoethylenically unsaturated monomer may be utilized, depending upon the properties desired, the preferred monoethylenically unsaturated monomers are the alkyl esters of acrylic or methacrylic acid, particularly those having about 1 to about 4 carbons in the alkyl group. Representative of such compounds are: alkyl acrylates, such as methylacrylate, ethylacrylate, propylacrylate and butylacrylate and the alkyl methacrylates, such as methylmethacrylate, ethylmethacrylate, propylmethacrylate and butylmethacrylate. Other ethylenically unsaturated monomers which may be advantageously employed include, for example, the vinyl aromatic hydrocarbons, such as styrene, alpha-methylstyrene, vinyl toluene, unsaturated esters of organic and inorganic acids, such as vinyl acetate, vinyl chloride and the like, and the unsaturated nitriles, such as acrylonitrile, methacrylonitrile, ethacrylonitrile and the like.

Although numerous ethylenically unsaturated monoepoxides will come to the mind of those skilled in the art, representative of the most preferred monoepoxides for this class of crosslinked dispersions to which the improvement of this invention applies are glycidyl acrylate and glycidyl methacrylate.

In a particularly preferred crosslinked dispersion embodiment within the aforementioned class, the monomers used in the addition copolymerization to form the dispersed polymer are characterized in that the alpha, beta ethylenically unsaturated monocarboxylic acid is methacrylic acid, the other copolymerizable monoethylenically unsaturated monomer is methylmethacrylate and the crosslinking monomer is glycidyl methacrylate.

The dispersion stabilizer employed in the preparation of the stable crosslinked dispersions to which the improvement of this invention applies is a novel polymeric dispersion stabilizer comprising the reaction product of ethylenically unsaturated monomers (A) and copolymer reactant (B). Ethylenically unsaturated monomers (A) bear functionality capable of condensation reaction with a complementary functionality of copolymer reactant (B). That copolymer reactant (B) comprises a random copolymer of (x) between about 20 and about 45, preferably between about 25 and about 40, weight percent of ethylenically unsaturated monomers, homopolymers of which would be substantially insoluble in said organic liquid, (y) between about 40 and about 75, preferably between about 50 and about 65, weight percent of ethylenically unsaturated monomers, homopolymers of which would be substantially soluble in the same organic liquid, and (z) between about 2 and about 15, preferably between about 5 and about 10, weight percent of ethylenically unsaturated monomers bearing said complementary functionality capable of condensation reaction with the ethylenically unsaturated monomers (A). The ethylenically unsaturated monomers (A) are reacted with copolymer reactant (B) in an amount sufficient to react with at least about 10% of complementary functionality of the copolymer reactant (B). The addition polymerization used to prepare the stable crosslinked dispersion in the presence of the organic liquid and the polymeric dispersion stabilizer is carried at elevated temperatures such that the dispersion polymer is first formed and then crosslinked.

Polymeric Dispersion Stabilizer

As mentioned above, the polymeric stabilizer employed in the preparation of the stable crosslinked dispersions of this invention is a copolymer prepared by reacting ethylenically unsaturated monomers (A) and random copolymer reactant (B) through complementary functionality.

As used herein, "ethylenically unsaturated monomer" means any monomer which bears ethylenic unsaturation, including doubly unsaturated monomers (e.g., butadiene), and which is capable of polymerizing in a vinyl-type manner.

Condensation reactions between ethylenically unsaturated monomers (A) and complementary functionality of random copolymer reactant (B), as provided by ethylenically unsaturated monomers (z) used to prepare that copolymer reactant, may be selected from the numerous condensation reactions known to those skilled in the art. Common condensation reaction links are: ester links, especially those formed by ester interchange or reaction such as carboxyl/glycidyl, hydroxyl/acid anhydride or hydroxyl/acid chloride; ether links, especially when formed by addition reactions between alkylene oxides and hydroxyl groups; urethane links, especially these formed by reaction between isocyanate and hydroxyl; and amide links, especially when formed by amine/acid chloride reactions. By way of example, among the numerous condensation reaction complementary groups are: acid anhydride/hydroxyl; acid anhydride/amine; acid anhydride/mercaptan; epoxide/acid; epoxide/amine; isocyanate/hydroxyl; hemiformal/amide; carbonate/amine; cycloimide/amine; and cycloimide/hydroxyl. Among the numerous monomers which may provide the reactive groups either in the case of ethylenically unsaturated monomers (A) or ethylenically unsaturated monomers (z) used to prepare random copolymer reactant (B) are: maleic anhydride; maleic acid; itaconic acid; acid esters of maleic and itaconic acids; glycidyl methacrylate; glycidyl acrylate; hydroxy alkyl methacrylates; hydroxy alkyl acrylates; acrylamide; methacrylamides; dimethyl aminoethyl methacrylate; vinylidene carbonate, N-carbamyl maleimide, vinylisocyanate, etc.

Random copolymer reactant (B) bears complementary functionality which reacts with functionality on ethylenically unsaturated monomers (A) to form the stabilizer copolymer. The random copolymer is formed from three types of monomers as discussed above. The first type (x) comprises ethylenically unsaturated monomers characterized by the fact that if they were formed as homopolymers they would be substantially insoluble in a selected organic solvent, which in the case of the instant invention would be organic liquid or solvent used in preparation of the stable crosslinked dispersion.

The first type of ethylenically unsaturated monomer (x) is employed in the random copolymerization in an amount ranging from about 20 and about 45, preferably between about 25 and about 40, weight percent of the total monomers used to form copolymer reactant (B). The second type of ethylenically unsaturated monomer (y) employed in the preparation of the random copolymer reactant (B) is characterized by the fact that homopolymers thereof would be substantially soluble in the aforementioned organic liquid or solvent. This type of monomer is employed in amounts ranging from about 40 to about 75, preferably from about 50 to about 65, weight percent of total monomers used in the random copolymerization.

By "substantially soluble" or "sustantially insoluble" in a selected organic liquid it is meant that the homopolymers in question would be either soluble or insoluble to the extent of about 90% in said selected organic liquid.

It will be appreciated that since the selected organic liquid used in determining the solubility and insolubility of the first two types of monomers used in the random polymer is generally the same as the organic liquid in which the stable crosslinked dispersion of the invention is to be formed, the question of relative solubility and insolubility in the particular organic liquid will be determined by the same factors as are used as guidelines when determining which monomers and solvents are to be employed in the preparation of the stable crosslinked dispersion itself. To this end, it will be appreciated that there are essentially three types of systems or reasons why a given polymer, or in the case of the determination of monomers for the random copolymer, homopolymers, are either soluble or insoluble in a given organic liquid. First, the homopolymer may be soluble or insoluble because it is polar relative to the organic liquid. Secondly, it may be soluble or insoluble because it is non-polar relative to the organic liquid. Thirdly, it may be soluble or insoluble in all common organic liquids because of its molecular structure and irrespective of relative polarity. Thus, in selecting a monomer which is characterized in that homopolymers thereof would be substantially insoluble in a selected organic liquid, it is necessary to consider the type of organic liquid which is to be employed in making the determination of solubility or insolubility and to select a monomer which a when homopolymerized will exhibit the desired insolubility. With respect to the second type of ethylenically unsaturated monomer, i.e., one which is characterized in that homopolymers thereof would be substantially soluble in the organic liquid, it is necessary to select a monomer which when homopolymerized will be soluble in that given organic liquid. The types of monomers, homopolymers of which will be soluble in given types of organic liquids should be apparent to those skilled in the art of nonaqueous dispersions. For a thorough discussion of relative solubilities and insolubilities attention is directed to the above discussed prior art patents.

Generally speaking, when the organic liquid is of a non-polar nature, such as an aliphatic hydrocarbon, suitable monomers, homopolymers of which would be insoluble or substantially insoluble therein, include acrylic monomers selected from (a) esters of $C_1$–$C_3$ aliphatic alcohols and acrylic, methacrylic or ethacrylic acids, (b) acrylic and methacrylic acids, and (c) ethylene and propylene glycol monoesters of acrylic, methacrylic or ethacrylic acids. These are essentially polar monomers or monomers which form polar homopolymers which would be substantially insoluble in a non-polar solvent such as aliphatic hydrocarbon. Especially preferred for use as this first type of monomer which would be insoluble in an aliphatic hydrocarbon or other non-polar solvent is the polar monomer methylmethacrylate. Exemplary of suitable monomers for use as the second type of monomer characterized by being substantially soluble in a non-polar solvent such as an aliphatic hydrocarbon would be esters of $C_4$–$C_{18}$ aliphatic alcohols and acrylic, methacrylic or ethacrylic acids. It will be appreciated that monomers characterized in that they would form homopolymers which are highly polar, could be used in more polar organic liquids such as aromatic hydrocarbons, fatty esters and fatty ketones and still be substantially insoluble therein. Those skilled in the art will appreciate the numerous selections which could be made.

If the organic liquid in which the crosslinked dispersion of the invention is to be prepared is one which is polar rather than non-polar, then the particular ethylenically unsaturated monomers selected for the first two types (x) and (y) used in the preparation of random copolymer reactant (B) will differ. Among the numerous polar solvents which will come to the mind of those skilled in the art are various alcohols such as methanol and ethanol, glycols, esters, ethers, polyols and ketones. When using such polar organic liquid the first type of monomer (x) (that which is characterized by being substantially insoluble in the organic liquid) may be selected from numerous monomers which would be apparent to those skilled in the art. Among the long list are hydrocarbons are those such as styrene, vinyltoluene, divinylbenzene, isoprene, butadiene, isobutylene and ethylene. Also, of course the higher fatty esters of unsaturated acids such as acrylic, methacrylic and ethacrylic acids wherein the alcohol component of the ester contains a long carbon to carbon chain can be employed. Preferably these are esters of $C_4$–$C_{18}$ aliphatic alcohols and acrylic, methacrylic or ethacrylic acids. The polar monomers, or monomers homopolymers of which would be polar and therefore substantially soluble in such an organic liquid, would include numerous monomers including those acrylic monomers selected from (a) esters of $C_1$–$C_3$ aliphatic alcohols and acrylic, methacrylic or ethacrylic acids, (b) acrylic and methacrylic acids and (c) ethylene and propylene glycol monoesters of acrylic, methacrylic or ethacrylic acids.

While, as discussed above, numerous types of ethylenically unsaturated monomers may be employed in preparation of the stabilizer as any one of the monomers (A) or any of the three types of monomers (x), (y) or (z) used in the random copolymerization to form copolymer reactant (B) which reacts with monomers (A), it is preferred that such monomers be acrylic monomers. "Acrylic monomer" as used herein means a monomer based on acrylic, methacrylic or ethacrylic acids. In those cases where complementary functionality is desired for a reaction between monomers (A) and random copolymer reactant (B), the acid itself may, of course be employed. Other types of acrylic monomers, which are commonly known to those skilled in the art and which are desirable for use in the preparation of the stabilizer of the invention, are the numerous well known esters of acrylic, methacrylic and ethacrylic acids.

Random copolymer reactant (B), used to prepare the polymeric dispersion stabilizer used in the compositions of the invention has a number average molecular weight in the range of between about 4,000, and about 15,000, preferably, from about 6,000 to about 10,000. While, ethylenically unsaturated monomers (A) are reacted with random copolymer reactant (B) in amounts sufficient to react with about 10 percent of said complementary functionality of copolymer reactant (B), it is preferred that the reactants be combined in amounts such that monomers (A) react with between about 0.5 and about 3.0 weight percent of copolymer reactant (B).

The invention will be more fully understood from the following detailed examples which are merely exemplary of the multitude of compositions which fall within the scope of the invention.

EXAMPLE 1

A 2-liter flask equipped with a stirrer, thermometer, dropping funnel, and water condenser was charged with 590 grams n-butyl acetate and 0.4 gram t-butyl perbenzoate initiator. The initiator solution was heated to 120° C. While maintaining the temperature at 120° C., a mixture of 496 grams 2-ethylhexyl acrylate, 224 grams methyl methacrylate, 80 grams glycidyl methacrylate, and 4.2 grams t-butyl peroctoate was added dropwise over a period of 3 hours. One hour after the addition, a mixture of 0.84 grams t-butyl peroctoate and 25 grams n-butyl acetate was added and the reaction was allowed to continue for an additional 2 hours. Then a mixture of 1.28 grams hydroquinone, 6.4 grams methacrylic acid, 1.2 grams dimethyl dodecylamine, and 140 grams of n-butyl acetate was added to the reaction mixture. The reaction was held at 120° C. until the acid number was 0.2 mg KOH/gram. The reaction product was a darkly colored solution having a solids content 50.6%, a Gardner viscosity of F, a number average molecular weight of 8545, and a weight average molecular weight of 28,865 determined by gel permeation chromatography using polystyrene calibration.

EXAMPLES 2-7

Following the procedure of Example 1, a variety of stabilizers of various kind and ratio of monomers was prepared. Table I summarizes the monomers ratio and properties of some typical stabilizers.

TABLE I

| Example | $M_1$ Non Polar Monomer | $M_2$ Polar Monomer | $M_3$ Functional Monomer | $M_4$ Complementary Unsaturated Monomer | Ratio of $M_1/M_2/M_3/M_4$ | Gardner Viscosity | Solids Content |
|---|---|---|---|---|---|---|---|
| 2 | EHA | MMA | GMA | MAA | 54/40/6/1 | S | 58.3% |
| 3 | EHA | MMA | GMA | MAA | 59/35/6/2 | T | 59.1% |
| 4 | EHA | MMA | GMA | MAA | 59/35/6/1 | — | 57.1% |
| 5 | EHA | MMA | GMA | MAA | 65/25/10/0.8 | G-H | 53.7% |
| 6 | LA | MMA | GMA | MAA | 65/25/10/1.0 | D | 49.3% |
| 7 | EHA | MMA | GMA | MMA | 64/30/6/1 | N | 57.2% |

Notes:
The following abbreviations are used:
EHA = 2-Ethylhexylacrylate;
MMA = Methyl Methacrylate;
GMA = Glycidyl Methacrylate;
MAA = Methacrylic Acid;
LA = Lauryl acrylate

EXAMPLE 8

A nonaqueous acrylic dispersion polymer was prepared by heating to 90° C. 991 grams heptane, 41 grams methyl methacrylate, 8 grams of stabilizer for Example 5, and 0.7 gram azobis (isobutyronitrile) in a 5-liter flask which was equipped with a stirrer, thermometer, addition funnel, and water condenser. The reaction was held at 90° C. for 30 minutes; then a mixture of 1022 grams methyl methacrylate, 55 grams glycidyl methacrylate, 34 grams methacrylic acid, 3.4 grams dimethyl dodecylamine, 152 grams of stabilizer for Example 5, 427 grams Espesol 260H(a) and 7.7 grams azobis (isobutyronitrile) was added dropwise over a period of 4 hours. One hour after the addition, 0.77 gram azobis (isobutyronitrile) dissolved in 150 grams n-butyl acetate was added. The reaction was allowed to continue for an additional 2 hours. The resulting milky white acrylic dispersion polymer has a solids content of 43.0% and a Ford No. 2 Cup viscosity of 28.9 seconds.

(a) Espesol 260H is an aliphatic hydrocarbon solvent mixture with a boiling point range of 262°-284° F., a specific gravity of 0.731, a KB value of 30 and an aromatic content of about 5 percent. It is manufactured by Charter Chemical Co. of Houston, Tex.

EXAMPLE 9

Stabilized Flow Control Additive I

An acrylic stabilizer copolymer with a composition of 65/24/10/1.0 2-ethylhexyl acrylate/methyl methacrylate/glycidyl methacrylate/methacrylic acid was prepared in accordance with the procedure of Example 1. The copolymer had a G viscosity (Gardner-Holdt) at 50% solids in n-butyl acetate.

A flow control additive was prepared according to the procedure of Example 8 in which 1063 parts of methyl methacrylate, 55 parts of glycidyl methacrylate and 34 parts of methacrylic acid in the presence of 160 parts of the acrylic stabilizer solution. The additive had a viscosity of 26.5 seconds on a No. 2 Ford Cup at a 42.9% solids.

A stabilized flow control additive was prepared by mixing 1400 parts of the additive with 938 parts of Syn U Tex 4113E[(a)] and 148 parts of isopropyl acetate. The stabilized flow control additive has a viscosity of 34.2 seconds on a No. 2 Ford Cup at 47.5% solids.

(a) Syn U Tex 4113E is a butylated melamine formaldehyde resin manufactured by Celanese Coatings and Specialties Company, which is 65% nonvolatiles in a 2/1 blend of butyl acetate/butyl alcohol and has a number molecular weight in the range of about 700 to about 2500. The viscosity of the 65% solution is a W (Gardner-Holdt).

EXAMPLE 10

Silver Metallic Enamel

A silver metallic enamel was prepared by mixing the following ingredients.

| Acrylic Resin A[a] | 2166 |
|---|---|
| Acrylic Resin B[b] | 1634 |
| Syn U Tex 4113E | 1066 |
| Flow Control Additive (Example 9) | 1152 |
| Aluminum Paste (60% aluminum flake) | 175 |
| Polybutyl acrylate (60% in xylene) | 31 |
| Isobutyl acetate | 930 |
| Ethylene glycol ethyl ether acetate | 745 |

The enamel was sprayed on a primed steel panel and cured for 17 minutes at 265° C. in a forced air oven. The panel had excellent brilliance and distinctness of image due to the even distribution of aluminum flake in the paint. A control enamel with no flow control additive appeared much darker and showed an uneven distribution of flake.

(a) Acrylic Resin A is a typical automotive thermoset acrylic resin with a monomeric composition of 37/20/27/15/1 styrene/methyl methacrylate/butyl acrylate/hydroxypropyl methacrylate/acrylic acid. The resin has Z viscosity at 55% NV in 70/12/18 cellosolve acetate/butanol/toluene.

(b) Acrylic Resin B is an automotive thermoset acrylic resin with a 30/30/20/19/1 styrene/butyl methacrylate/2-ethylhexyl/acrylate/hydroxypropyl methacrylate/acrylic acid composition. The resin had a T viscosity at 50% nonvolatiles in 50/50 cellosolve acetate/isopropyl acetate.

EXAMPLE 11

White Enamel

A white enamel was prepared by mixing the following ingredients.

| Titanium Dioxide Millbase[d] | 2891 |
|---|---|
| Acrylic Resin C[e] | 1241 |
| Acrylic Resin D[f] | 1099 |
| Syn U Tex 4113E | 1173 |
| Flow Control Additive (Example 9) | 229 |
| Polybutyl acrylate (60% in xylene) | 25 |
| Isobutyl acetate | 2268 |
| Ethylene glycol monoethyl ether acetate | 558 |

A primed panel was sprayed so that a film thickness wedge of 1.7 mils to 3.5 mils was realized after the panel was baked for 17 minutes at 265° F. Sagging of the film began at the 2.5 mil thickness region. A control enamel which did not contain the flow control additive sagged at about 1.9 mils.

(d) The Millbase was prepared from:

| Titanium dioxide | 600 parts |
|---|---|

| -continued | |
|---|---|
| Acrylic Resin D | 250 parts |
| VM&P Naptha | 110 parts |
| Methyl Amyl Ketone | 50 parts |
| Butyl Acetate | 40 parts |
| Toluene | 40 parts |
| Xylene | 8 parts |

(e) Acrylic Resin C is an acrylic copolymer of 30/30/20/18/2 styrene/butyl methacrylate/2-ethylhexyl acrylate/hydroxypropyl methacrylate/acrylic acid. The resin had a Z viscosity at 50% solids in xylene.

(f) Acrylic Resin D is an acrylic copolymer of 28/30/20/20/2 styrene/butyl methacrylate/ethylhexyl acrylate/hydroxypropyl methacrylate/acrylic acid. The resin had a T viscosity at 60% solids in a 1/1 methyl amyl ketone/VM&P Naptha.

EXAMPLE 12

Stabilized Flow Control Additive II

An acrylic stabilizer with a comonomer composition of 62/32/6/1 ethylhexyl acrylate/methyl methacrylate/glycidyl methacrylate/methacrylic acid was prepared according to the procedure of Example 1. The copolymer had an R viscosity at 56.2% solids in butyl acetate. A flow control additive was prepared from:

| 1063 | gms. of methyl methacrylate |
|---|---|
| 55 | gms. of glycidyl methacrylate |
| 34 | gms. of methacrylic acid |
| 160 | gms. of acrylic stabilizer |
| 8.4 | gms. of azobisisobutyronitrile |
| 3.4 | gms. of dimethyl dodecanoic amine |
| 7.7 | gms. of octyl melcaptan |
| 991 | gms. of heptane |
| 427 | gms. of VM&P Naptha |
| 150 | gms. of butyl acetate | according to the procedure of Example 8. The dispersion had a % nonvolatiles of 43% and a No. 2 Ford Cup viscosity of 26.8 seconds.

A stabilized flow control additive was prepared by mixing 1000 grams of the dispersion, 670 grams of Syn U Tex 4113E and 106 grams of isopropyl acetate. The stabilized additive had a viscosity of 37.0 seconds on a No. 2 Ford Cup at 48.2% soldis.

EXAMPLE 13

High Solids White Enamel

A white enamel was prepared by mixing the following ingredients.

| Acrylic Resin G[a] | 3362 |
|---|---|
| Cymel 325[b] | 1381 |
| Flow Control Additive (Example 12) | 618 |
| Phenyl acid phosphate | 32 |
| White Millbase | 3077 |
| Butanol | 361 |
| Methanol | 242 |
| 2-Ethylhexyl Acetate | 245 |
| Monobutyl ether of diethylene glycol | 140 |
| methyl amyl ketone | 441 |

The white millbase was prepared from:

| Titanium Dioxide | 2215 |
|---|---|
| Acrylic Resin H[c] | 385 |

| | |
|---|---|
| Methyl amyl ketone | 446 |
| Isopropyl acetate | 25 |

The enamel has a weight solids content of 66% and a No. 4 Ford Cup viscosity of 31.5 seconds. When sprayed on a primed panel and cured at 265° F. for 20 minutes, no sagging was observed at film thicknesses below 70 microns film thickness.

(a) Acrylic Resin G is an acrylic copolymer of 71/25/4 butyl methacrylate/hydroxyethyl acrylate/acrylic acid which has a Z1 viscosity at 80% in methyl amyl ketone.

(b) Cymel 325 is a methylated formaldehydemelamine resin at 80% NV and is a commercial product of American Cyanamid Company.

(c) Acrylic Resin H is an acrylic copolymer of 68/30/2 butyl methacrylate/hydroxyethyl acrylate/acrylic acid which has a Z viscosity at 80% NV in methyl amyl ketone.

EXAMPLE 14

High Solids Green Metallic Enamel

A dark green enamel with improved aluminum control and good sag resistance was prepared by mixing the following ingredients.

| | |
|---|---|
| Acrylic Resin G | 3586 |
| Cymel 325 | 1370 |
| Flow Control Additive | 1000 |
| Phenyl acid phosphate | 24 |
| Aluminum Paste[1] | 128 |
| Yellow Millbase[2] | 603 |
| Blue Millbase[3] | 185 |
| Black Millbase[4] | 254 |
| Methanol | 225 |
| Ethyl Acetate | 177 |
| Butyl Acetate | 177 |
| Methyl Amyl Ketone | 201 |
| Cellosolve Acetate | 112 |
| Butyl Alcohol | 203 |
| Ethylhexyl Acetate | 81 |

The enamel was 60% weight solids at 29 seconds viscosity in a No. 4 Ford Cup.

(1) The aluminum paste was a mixture of:

| | |
|---|---|
| Acrylic Resin H | 3125 |
| Aluminum Flake | 25 |
| VMP Naptha | 12.2 |
| Butyl Alcohol | 6.5 |
| Cellosolve Acetate | 25 |

(2) The yellow millbase was a mixture of:

| | |
|---|---|
| Yellow shade phthalocyanine green | 90 |
| Acrylic Resin H | 181 |
| Methyl Amyl Ketone | 120 |
| Butyl Alcohol | 211 |

(3) The blue millbase was a mixture of:

| | |
|---|---|
| Phthalocyanine blue | 15 |
| Melamine Resin X | 37 |
| Butyl Alcohol | 133 |

(4) The black millbase was a mixture of:

| | |
|---|---|
| Furnace black | 13 |
| Acrylic Resin H | 196 |
| Methanol | 21 |
| Xylene | 24 |

In view of the disclosure, many modifications of this invention will be apparent to those skilled in the art. It is intended that all such modifications which fall within the true scope of this invention be included within the terms of the appended claims.

What is claimed is:

1. A stable crosslinked dispersion containing microgel particles, said dispersion being:
   (i) formed by addition polymerization of
      (a) between about 1 and about 10 mole percent each of first and second ethylenically unsaturated monomers, each bearing functionality capable of crosslinking reaction with the other, and
      (b) between about 80 and about 98 mole percent of at least one monoethylenically unsaturated monomer
   in the presence of (I) a hydrocarbon dispersing liquid which is a solvent for the polymerizable monomers, but a non-solvent for the resultant polymer, and (II) polymeric dispersion stabilizer comprising the reaction product of ethylenically unsaturated monomers (A) and copolymer reactant (B), said ethylenically unsaturated monomers (A) bearing functionality capable of condensation reaction with complementary functionality of said copolymer reactant (B) which comprises a random copolymer of
      (x) between about 20 and about 45 weight percent of ethylenically unsaturated monomers, homopolymers of which would be substantially insoluble in said organic liquid;
      (y) between 40 and about 75 weight percent of ethylenically unsaturated monomers, homopolymers f which would be substantially soluble in said organic liquid; and
      (z) between about 5 and about 15 weight percent of ethylenically unsaturated monomers bearing said complementary functionality capable of condensation reaction with said ethylenically unsaturated monomers (A), said ethylenically unsaturated monomers (A) being reacted with said copolymer reactant (B) in an amount sufficient to react with at least about 10 percent of said complementary functionality on said copolymer reactant (B), wherein said addition polymerization is carried out at elevated temperature such that the dispersion polymer is first formed and then crosslinked; and
   (ii) stabilized further by inclusion therein of a further stabilizer which, except for solvent, consists essentially of butylated melamine formaldehyde resin having a number average molecular weight in the range of about 700 to about 2,500, said further stabilizer being included in said crosslinked dispersion in an amount ranging from about 15 to about 75 parts of resin solids per 100 parts total resin solids in said crosslinked dispersion.

2. A stable crosslinked dispersion in accordance with claim 1 wherein said random copolymer reactant (B) employed in preparation of said polymeric dispersion stabilizer is prepared from ethylenically unsaturated monomers (x) and (y) which are selected such that homopolymers thereof would be substantially soluble or insoluble in said organic liquid as a result of relative polarities of said homopolymers and said organic liquid.

3. A stable crosslinked dispersion in accordance with claim 2 wherein said organic liquid comprises a polar solvent.

4. A stable crosslinked dispersion in accordance with claim 2 wherein said organic liquid comprises a nonpolar solvent.

5. A stable crosslinked dispersion in accordance with claim 1 wherein at least a portion of said ethylenically unsaturated monomers (x), (y) and (z) used in preparation of said copolymer reactant (B) and at least a portion of said unsaturated monomers (A) which are reacted with said copolymer reactant (B) to form said polymeric dispersion stabilizer comprise acrylic monomers.

6. A stable crosslinked dispersion in accordance with claim 5 wherein said copolymer reactant (B) used in preparation of said polymeric dispersion stabilizer is characterized in that one of said ethylenically unsaturated monomers (x) or (y) comprises an ester of a $C_4$-$C_{18}$ aliphatic alcohol and acrylic, methacrylic or ethacrylic acid, and the other of said ethylenically unsaturated monomers (x) or (y) comprises an acrylic monomer selected from (a) esters of $C_1$-$C_3$ aliphatic alcohols and acrylic, methacrylic or ethacrylic acids, (b) acrylic and methacrylic acids, and (c) ethylene and propylene glycol monoesters of acrylic, methacrylic or ethacrylic acids.

7. A stable crosslinked dispersion in accordance with claim 6 wherein said organic liquid comprises aliphatic hydrocarbon and said copolymer reactant (B) used in preparation of said polymeric dispersion stabilizer is characterized in that said ethylenically unsaturated monomer (x) is methylmethacrylate, and said ethylenically unsaturated monomer (y) is 2-ethylhexylacrylate.

8. A stable crosslinked dispersion in accordance with claim 7 wherein said polymeric dispersion stabilizer is characterized in that one of said ethylenically unsaturated monomers (A) or (z) is glycidylacrylate or methacrylate and the other of said ethylenically unsaturated monomers (A) or (z) is acrylic or methacrylic acid.

9. A stable crosslinked dispersion in accordance with claim 1 wherein said polymeric dispersion stabilizer is characterized in that said complementary functionalities on said ethylenically unsaturated monomer (A) and said ethylenically unsaturated monomers (z) are selected such that they react to form linkages selected from the group consisting of esters, ethers, amides and urethanes.

10. A stable crosslinked dispersion in accordance with claim 9 wherein said polymeric dispersion stabilizer is characterized in that said linkage is an ester formed by reaction of epoxide with acid.

11. A stable crosslinked dispersion in accordance with claim 1 wherein the functionalities of said first and second ethylenically unsaturated monomers used to form the dispersed polymer of said dispersion respectively are selected from the group consisting of: (a) acid and epoxide; (b) epoxide and amine; (c) said anhydride and hydroxyl; (d) acid anhydride and amine; (e) acid anhydride and mercaptan; (f) isocyanate and hydroxyl; (g) hemiformal and amide; (h) carbonate and amine; (i) cycloimide and amine; (j) cycloimide and hydroxyl; and (k) imine and alkoxysilane.

12. A stable crosslinked dispersion in accordance with claim 11 wherein said dispersing liquid is an aliphatic hydrocarbon solvent and said first and second ethylenically unsaturated monomers (a) and said at least one other ethylenically unsaturated monomer (b) used in the preparation of said dispersed polymer are acrylic monomers.

13. A stable crosslinked dispersion in accordance with claim 11 wherein said dispersion is formed by free radical addition copolymerization in the presence of hydrocarbon dispersing liquid from about 2 to about 5 mole percent of alpha, beta ethylenically unsaturated monocarboxylic acid, from about 90 to about 96 mole percent of at least one other copolymerizable monoethylenically unsaturated monomer and from about 2 to about 5 mole percent of crosslinking monomer selected from the group consisting of ethylenically unsaturated monoepoxides.

14. A stable crosslinked dispersion in accordance with claim 12 wherein said monomers used in the addition copolymerization to form said dispersed polymer are characterized in that said alpha, beta ethylenically unsaturated monocarboxylic acid is methacrylic acid, said other copolymerizable monoethylenically unsaturated monomer is methylmethacrylate and said crosslinking monomer is glycidyl methacrylate.

15. A stable crosslinked dispersion in accordance with claims 1, 2, 8, 11 or 14 wherein said further stabilizer is included in said crosslinked dispersion in an amount ranging from about 40 to about 60 parts of resin solids per 100 parts of total resin solids in said crosslinked dispersion.

16. A stable crosslinked dispersion in accordance with claim 15 wherein said crosslinked dispersion including said further stabilizer contains between about 40 and about 60 percent solids.

17. A stable crosslinked dispersion in accordance with claim 15 wherein said further stabilizer consists essentially of a solution of butylated melamine formaldehyde resin in organic solvent in an amount such that the percentage solids of said butylated melamine formaldehyde resin in said hydrocarbon solvent ranges from about 50 to about 90 percent.

18. A stable crosslinked dispersion in accordance with claim 17 wherein said further stabilizer consists essentially of a 65 percent solids solution of said butylated melamine formaldehyde resin in a 2/1 solution of butyl acetate and butyl alcohol.

* * * * *